United States Patent
Prade

(10) Patent No.: US 8,020,387 B2
(45) Date of Patent: Sep. 20, 2011

(54) METHOD OF OPERATING A BURNER, INCLUDING A COMBUSTION CHAMBER WITH A LOW NITROUS OXIDE EMISSION

(75) Inventor: Bernd Prade, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 854 days.

(21) Appl. No.: 11/665,101

(22) PCT Filed: Sep. 30, 2005

(86) PCT No.: PCT/EP2005/054941
§ 371 (c)(1),
(2), (4) Date: Apr. 10, 2007

(87) PCT Pub. No.: WO2006/040268
PCT Pub. Date: Apr. 20, 2006

(65) Prior Publication Data
US 2009/0120054 A1    May 14, 2009

(30) Foreign Application Priority Data
Oct. 11, 2004    (EP) .................................. 04024184

(51) Int. Cl.
*F02C 1/00* (2006.01)
(52) U.S. Cl. ........................ 60/772; 60/39.465
(58) Field of Classification Search ............... 60/39.465, 60/736, 772, 775
See application file for complete search history.

(56) References Cited

U.S. PATENT DOCUMENTS

| | | | | |
|---|---|---|---|---|
| 5,357,741 A * | 10/1994 | Talabisco et al. | ............... | 60/775 |
| 6,082,092 A * | 7/2000 | Vandervort | ..................... | 60/773 |
| 6,343,462 B1 * | 2/2002 | Drnevich et al. | ............... | 60/775 |
| 6,495,731 B1 | 12/2002 | Cordier et al. | | |
| 2003/0150216 A1 * | 8/2003 | O'Beck et al. | .................. | 60/775 |
| 2004/0013987 A1 * | 1/2004 | O'Rear et al. | ..................... | 431/2 |
| 2005/0022537 A1 * | 2/2005 | Lohn | .............................. | 60/772 |
| 2005/0028530 A1 * | 2/2005 | Doebbeling et al. | ............ | 60/773 |
| 2005/0091986 A1 * | 5/2005 | Gerhold | .......................... | 60/775 |
| 2007/0113631 A1 * | 5/2007 | Deuker | ........................... | 73/112 |
| 2007/0119178 A1 * | 5/2007 | Berenbrink et al. | ........... | 60/773 |

FOREIGN PATENT DOCUMENTS

| | | |
|---|---|---|
| DE | 197 31 209 A1 | 1/1999 |
| DE | 103 02 487 | 7/2003 |
| EP | 0 276 696 B1 | 8/1988 |
| JP | 11324727 A1 | 11/1999 |
| WO | WO 03/062618 A1 | 7/2003 |
| WO | WO 2004/035187 A2 | 4/2004 |

* cited by examiner

*Primary Examiner* — Louis Casaregola
*Assistant Examiner* — Phutthiwat Wongwian

(57) ABSTRACT

There is described a method for operation of a burner, whereby a fuel is supplied to the burner, sprayed into the combustion air, mixed with the combustion air to give a fuel/air mixture and burnt in a combustion chamber. With regard to a combustion particularly low in pollutants and, in order to reduce the nitrogen oxide emissions with relation to achieving a given nitrogen oxide emission level, a change in parameters characterizing the fuel is determined. Such a parameter may, for example, be the Wobbe index. There is further described a device for carrying out said method, comprising a fuel treatment device, with an analytical device for the analysis of the current fuel composition and a monitoring and control system.

5 Claims, 2 Drawing Sheets

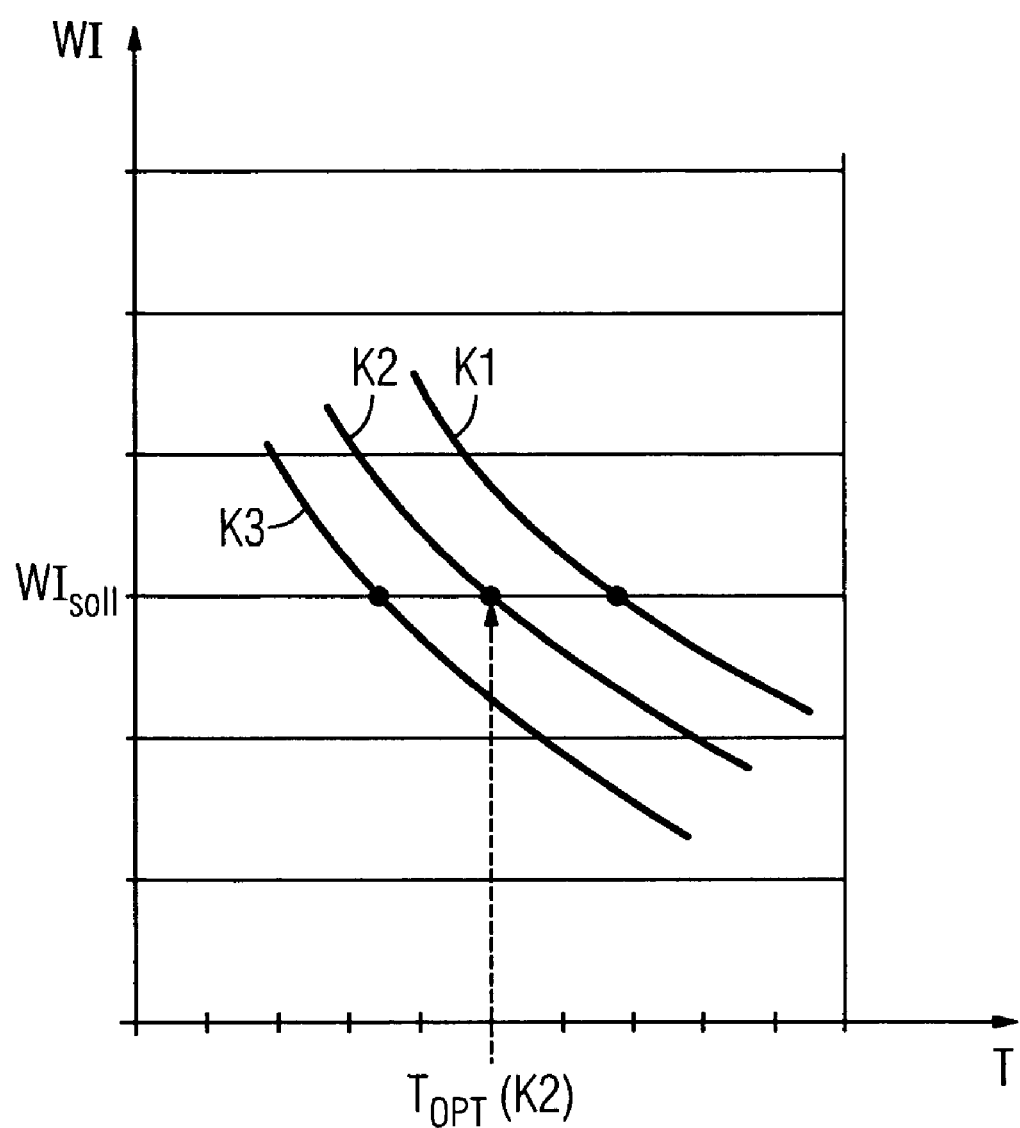

METHOD OF OPERATING A BURNER, INCLUDING A COMBUSTION CHAMBER WITH A LOW NITROUS OXIDE EMISSION

CROSS REFERENCE TO RELATED APPLICATIONS

This application is the US National Stage of International Application No. PCT/EP2005/054941, filed Sep. 30, 2005 and claims the benefit thereof. The International Application claims the benefits of European application No. 04024184.6 EP filed Oct. 11, 2004, both of the applications are incorporated by reference herein in their entirety.

FIELD OF INVENTION

The invention relates to a method for operating a burner, in which a fuel is supplied to the burner, sprayed into the combustion air and mixed with the combustion air into a fuel/air mixture and burned in a combustion chamber.

BACKGROUND OF THE INVENTION

In the light of international efforts for reduce pollutant emissions from heating systems, particularly gas turbines, burners and methods of operation for burners have been developed in recent years which have particularly low nitrous oxide ($NO_x$) emissions. In such cases emphasis has frequently been placed on the fact that such burners are able to be operated not just with one fuel but where possible with a wide variety of fuels, for example oil, natural gas and/or synthetic gas (e.g. coal gas) as required or even in combination in order to increase security of supply and flexibility during operation. Such burners are described for example in EP 0 276 696 B1.

An associated problem is that of a stable combustion in the burner, which is based on a stable location of the combustion zone in the burner. This alters drastically if changes occur in the composition of the fuel, meaning for example a combustion gas having a high proportion of high-grade saturated hydrocarbons, such as $C_{2+}$ alkane, ethane or propane. Under such circumstances there is a danger of flame blowbacks in the burner. Patent WO 03/062618 A1 thus in particular monitors the $C_{2+}$ alkane of the inflow combustion gas through infrared absorption. To avoid a blowback, with an increased proportion of $C_{2+}$ alkane, the combustion gas characteristic is regulated by intervening for example in the combustion gas supply, but also by injecting water or steam.

The problem in designing burners for all possible different operating conditions and fuels, especially when there is also a variation in the fuel composition or if there are fluctuations in fuel quality, lies in the fact that the volumes needed during operation in each case (fuel mass flow) of the individual fuels are completely different, making it difficult to use the same supply system and the same spray openings for all fuels. The use of different supply systems for liquid and gaseous materials is thus known in the prior art. A further problem then presents itself however if alternate gaseous fuels with entirely different specific calorific values, for example natural gas and coal gas, are to be used. The completely different volume ratios when using these two fuels and the different chemical processes during their combustion demand a modification and expansion of the known systems.

Modern low-$NO_x$ combustion systems are usually based on the so-called "jet in crossflow" mixing-in concept. Low-pollutant combustion, especially with low $NO_x$ emissions, can in this case be undertaken by corresponding designs of the mixing-in of the fuel into the cross-flow combustion air. An important design variable in such cases is the penetration depth of the fuel jets into the cross-flow air. This mechanical design adapted in the best possible manner is then correspondingly only used for a specific fuel composition. The invention now uses as its starting point the problem that, with a temporary alteration to the fuel composition or if the fuel is changed, the result can be an alteration of the mixing field, which, with an unfavorable mixture, usually leads to increased $NO_x$ emissions.

Based on this observation, an object of the invention is to specify a method for operation of a burner with which a low nitrous oxide combustion is possible even if there is a change to the fuel composition. A further object of the invention is to specify a suitable device for executing the method.

The first object is achieved in accordance with the invention by a method for operation of a burner, in which a fuel is supplied to the burner, sprayed into the combustion air and mixed with the combustion air into a fuel/air mixture and burned in a combustion chamber, in which case, to reduce the nitrous oxide emissions, a fuel characteristic is set explicitly to a predetermined nitrous oxide emission, with a change in a parameter characterizing the fuel being determined and with a penetration depth of the fuel jets into the combustion air adapted to the change being effected.

In this case the invention starts from the knowledge that the influence of fuel composition fluctuations on the $NO_x$ emissions should if possible not be compensated for by expensive burner-side measures or by expensive adaptations to the mechanical design in the combustion chamber, in order to achieve sufficient flexibility and timely adaptation to the predetermined nitrous oxide emissions. Constructive measures could only reduce the sensitivity to fluctuations in fuel quality—and thereby mixing field variations—to a limited extent, but could not eliminate them completely. This is attributable to the fact that, for a quite specific fuel composition in each case (fuel characteristic) the injection and mixing-in facilities of the burner are "optimized". Designs with a plurality of injection spray points for the fuel—well distributed over the cross section through which the flow is conducted—or the use of static mixers for setting a desired mixture field, in the absence of the required flexibility—especially with shorter-term variations in fuel composition—are not suitable for guaranteeing compliance with permitted emission limits for $NO_x$ emission during operation of the burner or of the combustion system. On the other hand the invention starts from the knowledge that, by spraying the fuel into the combustion air with a most favorable possible penetration level of the fuel jets, the mixing field will be adjusted in respect of a low-emission combustion. This mixing field can even be maintained during operation, taking into account the parameter characterizing the fuel.

Thus the invention proposes for the first time achieving an especially low nitrous oxide combustion by monitoring the fuel characteristic of the fuel composition, in order, if required, to use suitable measures to once again set an optimum low-pollutant operating mode as regards nitrous oxide if a parameter characterizing the fuel changes. This creates the opportunity of keeping the nitrous oxide emissions below a predetermined limit using a parameter which characterizes the fuel, with a penetration depth of the fuel jets adapted to the change being effected in the combustion air.

Preferably in this case the fuel is sprayed into the combustion air and mixed with the combustion air. Fuel and combustion air are mixed in the burner, with the best possible penetration depth of the fuel rays into the combustion air having to be ensured for the injection of the fuel into the combustion air. This means that the mixing field can be adjusted in respect of a low-pollutant combustion and can be maintained even during operation taking into account the parameter characterizing the fuel.

In an especially preferred embodiment a change in the parameter characterizing the fuel is registered and transferred to a control system. In this case the parameter characterizing the fuel is preferably continuously detected and evaluated in the control system. The parameter characterizing the fuel can in this case be determined by a suitable measurement of the fuel flow during operation and in this way the timing of the parameter characterizing the fuel can be stored and evaluated.

Preferably the fuel characteristic is set explicitly, with the value being set to a reference or required value of the parameter characterizing the fuel at which the predetermined pollutant emission occurs. In this case characteristic performance data determined in advance can already be stored in the control system, with said data representing the relationship between the fuel composition and the nitrous oxide emissions. Alternatively however an in-situ measurement of both the current nitrous oxide emission values and also the fuel composition is simultaneously measured and transferred to the control system.

In an especially preferred embodiment the Wobbe index is determined from a parameter characterizing the fuel. What is referred to as the Wobbe index is a normal standard used to characterize the fuel composition and temperature. The Wobbe index allows a comparison of the heat content of different fuels relative to their volume, especially combustion gases, to be made at different temperatures. Since a combustion system, such as a gas turbine for example, is operated such that in the final analysis heat energy is released in a combustion chamber and that the fuel flow is set by controlling the volume flow, fuels with different fuel composition but still with relatively similar Wobbe indexes are generally supplied by the same fuel supply system to the burner. Variations in the fuel composition lead to variations in the nitrous oxide emissions, with a setting of the Wobbe index enabling a permitted highest nitrous oxide emissions in the operation of the gas turbine.

In the inventive method the Wobbe index of the fuel is preferably determined by evaluating the relationship $$WI = \frac{LHV}{\sqrt{SG \cdot T/T_{Ref}}},$$

with LHV being the lower heat value of the fuel, T its absolute temperature and SG the specific gravity of the fuel relative to the air under standard conditions, and $T_{Ref}$ being a reference temperature.

In this case, for setting the desired Wobbe index, the temperature of the fuel is preferably set explicitly with respect to a predetermined nitrous oxide emission. According to the above formula the Wobbe index is related in a relatively simple manner to the current fuel temperature, namely inversely proportional to the square root of the fuel temperature. This means that, if the Wobbe index changes, i.e. the Wobbe index deviates from a predetermined required value with low nitrous oxide emissions, the desired Wobbe index and thereby the desired nitrous oxide emission can be set by a corresponding regulation of the fuel temperature. Depending on the situation the fuel can be warmed up or cooled down to the required value to enable a temperature setting of the required value of the Wobbe index to be used to achieve the desired $NO_x$ emission.

It is however also possible for a medium to be mixed in with the fuel for setting the fuel characteristic. A modification of the Wobbe index is also especially to be achieved in this way in order to ensure a low-pollution operation of the burner. The preferred medium considered for injection into the fuel is water, steam or nitrogen, but also hydrocarbons with a high heat value for example.

As an alternative to the Wobbe index, the so-called impulse flow density ratio can also be determined and evaluated as a parameter characterizing the operating state. Impulse flow density ratio: The mixture quality with "jet in crossflow" depends, with a given geometry, on the impulse flow density ratio, i.e. on the quotient of the impulse flow density ratio of the jet and on the impulse flow density ratio of the crossflow.

Impulse $I = M \cdot c = p \cdot c \cdot A \cdot c$

Impulse density $I = I/A$ (surface) $= pc^2$

Impulse flow density of the air is essentially given by ambient conditions and gas turbine performance. Impulse flow density of the fuel, apart from depending on the gas turbine performance also only depends on the fuel composition. The heating value gives the mass flow and thereby with the density for fixed geometry the impulse flow density. The impulse flow density is thus not a fuel characteristic but a variable which depends on the fuel composition. This variable can also be regulated to a desired required value if it changes by monitoring the fuel composition during the operation of the burner.

Preferably the method is applied when a burner of a gas turbine is operated. The demands for low-pollutant combustion during operation of gas turbines, especially with stationary gas turbines for energy production, have increased continuously in recent years. The method In accordance with the invention makes low-emission operation possible, with the regulation measures described above already being able to be undertaken on the fuel side during the operation of the gas turbine system if there are variations in the composition of the fuel. Expensive constructive measures on the burner side can be dispensed with.

A liquid or gaseous fuel is preferably used for operation. The method can be used example with oil, natural gas or with a synthetic gas, e.g. coal gas.

An object of the invention directed to a device is achieved by a device for carrying out the method with an analysis device for analysis of the current fuel composition during burner operation and with a checking and control system for determining a deviation and for setting the parameter characterizing a fuel to a required value, at which the predetermined pollutant emission is present.

The advantages of the inventive device are produced in the same way as the above-described advantages relating to the method.

The checking and control system is preferably designed in this case for setting the fuel temperature of the fuel, i.e. a heating up or cooling down the fuel as required.

The checking and control system also preferably includes means for controlled injection of an inert medium, especially steam, water or nitrogen or of a hydrocarbon, into the fuel.

BRIEF DESCRIPTION OF THE DRAWINGS

The invention will be explained in greater detail below with reference to an exemplary embodiment. The diagrams are schematic and not to scale.

The same reference symbols have the same meaning in the figures.

DETAILED DESCRIPTION OF INVENTION

Figure 1:
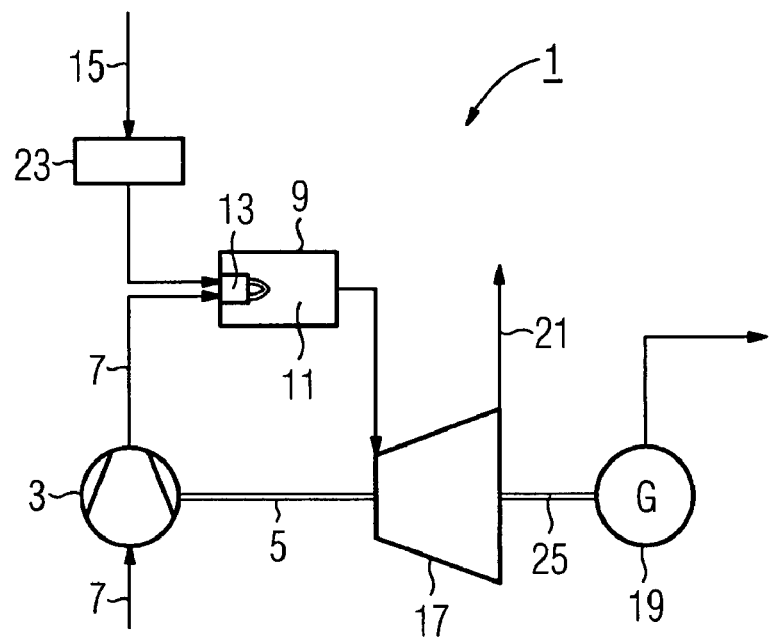
FIG. 1 a gas turbine system.

A gas turbine system in accordance with FIG. 1 has a gas turbine 1 which has a compressor 3, a combustion chamber 9 and also a turbine 17 downstream of the combustion chamber 9. The compressor 3 and the turbine 17 are if necessary coupled to each other via a common rotor shaft 5. Connected downstream from the turbine 17 is an electrical generator 19 for example, coupled via a generator shaft 25 to the turbine 17. The combustion chamber 9 comprises a combustion area 11 as well as a burner 13 protruding into the combustion area 11 for combustion of a liquid or of a gaseous fuel 15. During operation of the gas turbine 1 air 7 is sucked into the compressor 3 and compressed there. The compressed air 7 is supplied to the burner 13 as combustion air and mixed with fuel 15. The fuel/air mixture produced by this process is burned in the combustion chamber 11, producing hot combustion gases. The hot combustion gases are supplied to the turbine 17, where they expand to generate work and cause both the compressor-side rotor shaft 5 and also the generator shaft 25 to rotate. In this way electrical power is created, which the generator 19 outputs for distribution in an electrical network. On the downstream side of the turbine 17 the partly cooled and expanded combustion gases are output as exhaust gas 21. These exhaust gases 21 are polluted, in particular nitrous oxide is present in the exhaust gas which forms at the high combustion temperatures in the combustion area 11. Increased nitrous oxide emissions also occur if the fuel/air mixture undergoes a change of the mixing field, as occurs for example when the fuel composition alters over time or when the fuel is to be changed for example. This generally leads to a less favorable mixture and to a considerable increase in the rate of nitrous oxide formation during the combustion processes. Previous measures from the prior art have merely been restricted in such cases to making new adaptations to the design of the combustion system, i.e. burner-side measures to enable pollutant emissions which are still acceptable when the composition of the fuel changes.

The invention by contrast does not provide for any measures for changing the design of the burner in order to resolve this problem, but instead explicitly influences the fuel characteristics during operation in order to adhere to the predetermined nitrous oxide emissions as an upper limit value. To this end the gas turbine 1 is equipped in the supply system for the fuel 15 with a fuel processing device 23, with said device 23 allowing both an analysis of the current fuel characteristic in the operation of the gas turbine 1 and also an explicit setting of a fuel characteristic in respect of the predetermined nitrous oxide emission for reducing nitrous oxides. In this way a change in a parameter characterizing the fuel 15 is determined and monitored. Furthermore the penetration depth of the fuel jets into the combustion air is adapted to the change.

Figure 2:
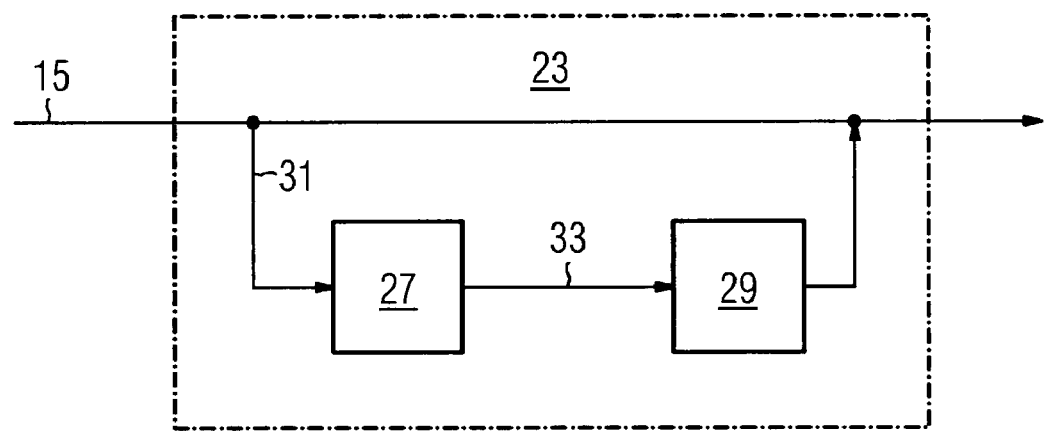
FIG. 2 a schematic diagram of a fuel processing device for low nitrous oxide operation of the gas turbine system in accordance with FIG. 1 and FIG. 3 a schematic diagram showing the relationship of the Wobbe index as a function of the combustion gas temperature for different fuel compositions.

FIG. 2 shows a greatly simplified diagram of the fuel processing device 23. The device 23 includes an analysis device 27 for the fuel 15 and a checking and control system 29 connected downstream from the analysis device 27. To explicitly monitor a fuel characteristic an analysis partial flow 31 is separated for example from the volume flow of the fuel 15 and supplied to the analysis device 27 for analysis purposes. The analysis of the fuel composition is undertaken in the analysis device 27. In this case a parameter characterizing the fuel 15, such as the Wobbe index for example, which has direct influence on the current nitrous oxide emission, is determined and this value is passed as an output signal 33 to the checking and control system 29. When this is done, the parameter characterizing the fuel 15 is continuously detected in the analysis device 27 and evaluated in the checking and control system 29. The required value is compared to the actual value in the checking and control system and the fuel characteristic is explicitly set so that the setting or regulation is made to the reference or required value of the parameter characterizing the fuel in which the predetermined nitrous oxide emission is present. The Wobbe index WI (see FIG. 3) is particularly suitable for use as the parameter characterizing the fuel 15. This can be regulated directly via a setting of the combustion temperature T in order to reach a desired value. A required correction of the Wobbe index WI if a deviation from the required value is established can alternatively also be achieved by injection of a medium into the fuel. Steam, water or nitrogen are considered as a suitable inert medium for use in regulating the Wobbe index WI to the required value. The impulse flow density ratio can alternatively also be determined and evaluated as a possible parameter. The fuel processing device 23 makes possible an in-situ regulation of a parameter characterizing the fuel as regards the lowest possible nitrous oxide emissions. The fuel 15 handled in this way in the fuel processing device 23 will then be fed to the burner 13, mixed with combustion air 7 to a fuel/air mixture internally and burned in the combustion area 11 as already described in detail above.

The Wobbe index WI is especially characteristic for the current fuel composition. The Wobbe index WI has a simple relationship to the fuel temperature T, as explained in greater detail in FIG. 3. FIG. 3 shows a diagram in which, for different fuel compositions, the dependency of the Wobbe index WI as a function of fuel temperature T is shown. Characteristic curves K1, K2 and K3 represent a particular fuel composition in each case. The Wobbe index WI is inversely proportional to the square root of the fuel temperature T. Since the Wobbe index characterizes the fuel composition, the Wobbe index WI can also be seen in conjunction with the relevant nitrous oxide emissions in the operation of a gas turbine 1. There is thus an "optimum" value for the Wobbe index $WI_{SOL}$, in which correspondingly lower nitrous oxide emissions are to be recorded. For a change of the fuel composition during operation of the gas turbine 1 the effect is thus to produce a change in the Wobbe index WI. This can be established by means of the analysis device 27. Using a setting of the fuel temperature T, the Wobbe index WI at the temperature $T_{OPT}$ (K2) can be set back to the required value of the Wobbe index $WI_{SOL}$, so that a desired value of nitrous oxide emissions is not exceeded.

The invention proposes changing the penetration depth of the fuel jets and thereby changing and correcting the mixing field through different measures during the operation of the gas turbine, if the composition of the fuel changes. To this end it is proposed that a parameter characterizing the fuel be monitored and set in respect of the desired nitrous oxide emission. The change in the fuel composition is passed to a checking and control system, either as a manual entry or via a measurement and analysis system 27 integrated into the control system which continuously measures the fuel composition. A suitable measure can be taken via a suitable conversion specification—for example by regulating the Wobbe index. Options are for example the change of the fuel temperature through preheating or reducing a fuel preheating, the admixture of steam, nitrogen or such like, or water to liquid fuels such as heating oil. A directly suitable variable for description of the corresponding fuel characteristic is the Wobbe index, for which, although there are different definitions, all of these can be related back to the fact that media with the same Wobbe index cause the same pressure loss at the fuel nozzle with the same heat input. The penetration depth of the fuel jets into the combustion air is linked to the pressure loss, so that the use and setting of a parameter characterizing the fuel such as the Wobbe number represents a relatively simple conversion specification for regulation to the desired nitrous oxide emission for variations of the fuel composition. Other adjustment variables, such as the impulse flow density ratio for example, are also conceivable.

The invention claimed is:

1. A method for operation of a burner with a combustion chamber, comprising:
    injecting fuel into a combustion air;
    mixing the fuel with the combustion air to form a fuel-air-mixture;
    burning the fuel-air-mixture in the combustion chamber of the burner;
    determining a parameter characterizing the fuel, the parameter being related to a nitrous oxide emission of the burner;
    setting a reference value based upon the parameter characterizing the fuel for achieving a predetermined nitrous oxide emission;
    determining a change of the parameter by comparing the determined parameter to the reference value;
    when the parameter has changed, changing the composition of the fuel by mixing a medium to the fuel in order to change the parameter to the reference value; and
    wherein the parameter characterizing the fuel is continuously detected in an analysis device and evaluated in a control system.

2. The method as claimed in claim 1, wherein the parameter characterizing the fuel is based upon a Wobbe index WI, the Wobbe index WI being based upon a formula as follows:

$$WI = \frac{LHV}{\sqrt{SG \cdot T/T_{Ref}}}$$

wherein
    LHV is the lower heat value of the fuel,
    T is the absolute temperature of the fuel,
    SG is the specific gravity of the fuel relative to air under standard conditions, and
    $T_{Ref}$ is a reference temperature.

3. The method as claimed in claim 1, wherein the medium is selected from the group consisting of: steam, water, nitrogen, hydrocarbon, and a combination thereof.

4. The method as claimed in claim 1, wherein the burner is a burner of a gas turbine.

5. The method as claimed in claim 1, wherein the fuel is selected from the group consisting of: oil, natural gas, synthetic gas, coal gas, and a combination thereof.

* * * * *